UNITED STATES PATENT OFFICE.

CARLETON ELLIS, OF MONTCLAIR, NEW JERSEY, ASSIGNOR TO NATIONAL CARBON COMPANY, INC., OF NEW YORK, N. Y., A CORPORATION OF NEW YORK.

MAKING MANGANESE COMPOUNDS.

1,276,739.　　　　Specification of Letters Patent.　　Patented Aug. 27, 1918.

No Drawing.　　Application filed October 27, 1917.　Serial No. 198,886.

*To all whom it may concern:*

Be it known that I, CARLETON ELLIS, a citizen of the United States, and a resident of Montclair, in the county of Essex and State of New Jersey, have invented certain new and useful Improvements in Making Manganese Compounds, of which the following is a specification.

This invention relates to a method of making manganese sulfate, manganese dioxid, or higher oxid of manganese, suitable as depolarizing material for dry batteries of the Leclanché type, and relates particularly to the production of depolarizer through the use of by-products, namely; the depolarizer contained in spent dry cells and sodium acid sulfate or niter cake as the reagent to react on such spent depolarizing material. The invention is not however, limited to the use of manganese dioxid obtained from spent depolarizing material but may be applied to manganese material obtained from other sources, including natural manganese oxid, such as pyrolusite, and the artificial dioxid, as well as various other compounds or salts or manganese of a suitable character. Likewise, although I prefer to use a reagent of the nature of niter cake, which is a by-product produced in large quantities, I may use sulfuric acid or other suitable reagent according to circumstances.

In carrying out the invention in the preferred form and therefore involving the use of spent depolarizing material and sodium acid sulfate, niter cake, or similar acid salt, I may proceed by stripping the depolarizer from the dry cells, washing with water to remove soluble salts, drying and grinding, if necessary. The dried material is mixed with 2 parts by weight of sodium acid sulfate and heated until fritted. The cake is ground and the manganese sulfate together with other soluble salts extracted and the solution filtered, preferably boiling hot. If iron is not completely removed by this procedure, traces present may be eliminated by special measures, but ordinarily to make manganese dioxid it is necessary merely to take the solution containing manganese sulfate, sodium sulfate and the like, and treat with an oxidizing agent such as sodium hypochlorite. This reaction preferably should be carried out in slightly acid solution, a free acid content of 3% to 5% of sulfuric being sufficient. The solution preferably should be heated to the boiling point or near it during the oxidizing step with the hypochlorite. Black manganese dioxid in a well hydrated condition is obtained and is filtered off, washed and dried. If desired, it may be extracted with dilute nitric acid to remove bodies soluble in the reagent.

The process makes possible the production of manganese dioxid by a series of coördinated steps from spent depolarizer of dry batteries of the Leclanché type or other suitable material. From waste depolarizer material the sulfate of manganese is obtained by reacting with an acid salt or acid-containing salt to form the sulfate and leaching out the manganese sulfate together with other soluble salts (such, for example, as sodium sulfate) thus separating soluble salts from the graphite and any of the insoluble impurities of the original manganese material. The solution is treated with an oxidizing agent, such as permanganate, chlorin, etc., but as stated, sodium hypochlorite in acid solution being preferred and manganese dioxid is formed under preferred conditions in the presence of a substantial quantity of a soluble salt of the nature of sodium sulfate which for example, may be present to the extent of 10% or more, under which conditions the manganese dioxid precipitates and a desirable form thereof may be obtained, preferably of a deep black color having good conductivity and of a satisfactory degree of hydration. The degree of hydration may be subsequently modified by careful heating to afford a product containing any desired degree of water of hydration. The invention thus embraces the conversion of spent depolarizer into active depolarizer, or the conversion of a waste material into a useful product.

What I claim is:—

1. The process of making manganese dioxid which comprises reacting on spent depolarizer of dry cells with niter cake at a temperature approximating the fritting point, in extracting the manganese sulfate formed and in reacting on the sulfate with sodium hypochlorite.

2. In the process of making manganese dioxid, the step which comprises reacting on spent depolarizer of dry cells with niter cake at a temperature approximating the fritting point in extracting the manganese sulfate formed and in forming manganese dioxid therefrom.

3. The process of making manganese dioxid which comprises reacting on raw material containing basic manganese compounds with acid material comprising acid sodium sulfate at a reacting temperature to form manganese sulfate and in converting the manganese of this salt into manganese dioxid.

4. The process of making manganese dioxid which comprises reacting on spent depolarizer of dry cells with an acid reagent, in extracting the manganese sulfate formed and in reacting on the salt with an oxidizing agent.

5. The process of making hydrated manganese dioxid of a black color from a spent depolarizer of dry cells of the Leclanché type which comprises heating the depolarizing mass with an acid sulfate to form manganese sulfate, in leaching the mass to form a solution of manganese sulfate and other soluble salts and thereby separating the graphite or other carbon present and in reacting on the solution with an oxidizing agent to form manganese dioxid.

6. The process of making hydrated manganese dioxid from a spent depolarizier of dry cells of the Leclanché type which comprises heating the depolarizing agent with an acid body to form a manganese salt, in leaching the mass to form a solution of manganese salt and in reacting on the solution with an oxidizing agent.

7. In the process of making hydrated manganese dioxid from a spent depolarizer of cells of the Leclanché type the step which comprises heating the depolarizing agent with an acid reagent to form a manganese salt, in leaching the mass to form a solution of manganese sulfate and in converting the manganese of this salt into manganese dioxid.

CARLETON ELLIS.